Patented Feb. 21, 1950

2,498,419

UNITED STATES PATENT OFFICE 2,498,419

METHOD OF PREPARING UNSATURATED IMINES

Vernon E. Haury, Simi, Calif., assignor to Shell Development Company, San Francisco, Calif., a corporation of Delaware No Drawing. Application December 19, 1947, Serial No. 792,845

12 Claims. (Cl. 260—566)

This invention relates to a novel method for preparing imines which are unsaturated in the beta-gamma position with respect to the radical which is linked by a double bond to the amino nitrogen atom.

Unsaturated imines of this character have heretofore been prepared by condensing an unsaturated aldehyde or ketone with an amine. However, the presence of the unsaturated linkages in the carbonyl reactant has often favored the formation of the other condensation products than the imine desired. In still other cases it has proven altogether impossible to prepare the unsaturated imine by this known method.

It has now been discovered that unsaturated imines having an olefinic double bond in the beta, gamma position of the radical linked by a double bond to the amino nitrogen atom, which imines may also be termed N-(2-alkenylidene) amines, may be prepared by a condensation reaction involving two molecules of an imine reactant which, for convenience, may be referred to as an N-(beta-dihydroalkylidene) amine, i. e., a compound wherein the alkylidene radical contains at least two hydrogen atoms on the carbon atom in the beta position with respect to the amine nitrogen atom. The reaction proceeds according to the following general equation:

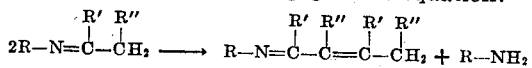

In this equation the symbol R represents an organic radical other than hydrogen which is capable of forming an amine, while R' and R", which may be the same or different substituents, are either hydrogen or saturated hydrocarbon radicals. The expression "saturated hydrocarbon radicals" as used herein and in the claims is intended to include not only hydrocarbon radicals in which the carbon atoms are all saturated, but also hydrocarbon radicals which contain aromatic multiple linkages but are free from olefinic or acetylenic multiple bonds.

The imino reactant in the equation given above may take any one of a wide variety of forms depending on the nature of the product desired.

For example, R may be an alkyl, alkenyl, aralkyl, aryl, alkaryl, acyl, alicyclic or heterocyclic radical. Examples of such radicals are methyl, ethyl, propyl, isopropyl, normal butyl, isobutyl, secondary butyl, tertiary butyl, normal pentyl, isopentyl, secondary pentyl, hexyl, normal octyl, iso-octyl, normal decyl, isodecyl, dodecyl, tetradecyl, cetyl, stearyl, trimethyl octodecyl, allyl, methallyl, crotyl, methyl vinyl carbinyl, butenyl, pentenyl, hexenyl, propargyl, geranyl, oleyl, phenyl, naphthyl, anthryl, tolyl, xylyl, secondary butyl-naphthyl, dipropyl-naphthyl, benzyl, naphthyl-butyl, phenethyl, vinyl-phenyl, crotonyl-naphthyl, methallyl - phenyl, triallyl - naphthyl, naphthylallyl, 2 - phenyl - ethenyl, phenyl vinyl carbinyl, cinnamyl, acetyl, propionyl, caproyl, stearacyl, benzoyl, cyclopentyl, ethyl-cyclohexyl, tributyl-cyclohexyl, cyclopentenyl, cyclohexenyl, vinyl cyclohexenyl, thioenyl, pyrrolyl, pyridyl, furyl, butyl carbothionyl, octyl carbothionyl, decyl carbothionyl, etc. Further these radicals may be substituted with other elements or groups as halogen, hydroxyl, amino, nitro, carbonyl, sulfo, cyano, etc. For example, such substituted radicals may be chlorobutyl, bromo-octyl, nitroethyl, hydroxycyclohexyl, nitrobenzyl, chlorallyl, chlorobenzoyl, tetrahydrofurfuryl, hydroxyethyl, dihydro-isophoryl, sulfoethyl, benzene sulfonyl, cyanoacetyl, etc. However, R is preferably a hydrocarbon radical, and more particularly, one selected from the group consisting of the alkyl, aryl, aralkyl, and alkaryl radicals.

The symbols R' and R" in the general formulae given above represent either the same or different substituent groups, including saturated hydrocarbon radicals of the type or kind noted above for the symbol R. However, R' and R" may also be hydrogen atoms. In the preferred practice of this invention, R' and R" are members selected from the group consisting of the hydrogen atom and alkyl radicals of the saturated variety.

The following table will illustrate particular imine reactants which may be condensed with themselves to prepare the corresponding N-(2-alkenylidene) amine products:

Table

| Imine Reactant | Imine Product |
|---|---|
| N-(3-methyl-2-butylidene)-cyclohexylamine | N-(2,3,6-trimethyl-3-hepten-5-ylidene) cyclohexylamine |
| N-(1-phenethylidene)-isopropylamine | N-(1,3-diphenyl-2-buten-1-ylidene)-isopropylamine |
| Acetonanil | Mesityloxide anil |
| N-isopropylidenebenzylamine | N-(4-methyl-3-penten-2-ylidene)-benzylamine |
| N-ethylidene-p-toluidine | N-(2-butenylidene)-p-toluidene |
| N-isopropylideneallylamine | N-(4-methyl-3-penten-2-ylidene)-allylamine |
| N-(1,2-diphenylethylidene) butylamine | N-(1,2,3,4-tetraphenyl-2-buten-1-ylidene)-butylamine |

Other imine compounds than those mentioned above may be employed in an analogous manner to produce the corresponding N-(2-alkenylidene)-amines of the class herein described. Further, mixtures of two or more imine reactants may also be employed, though as a general rule it is preferable to use only one such imine and thereby obtain an unsaturated imine of known composition as the principal product of the reaction.

The condensation reaction of this invention takes place slowly when the imine reactant is allowed to stand at room temperatures, though it goes forward at a much more rapid rate when the reactant is heated, especially with a condensation catalyst of the acidic or basic type.

As to the catalyst, representative basic materials are the alkali metal hydroxides such as sodium hydroxide and potassium hydroxide, the amines such as dipropylamine and diisobutylamine, as well as such quaternary ammonium compounds as trimethylbenzylammonium hydroxide and triethylbenzylammonium hydroxide. Appropriate catalysts of the acid acting type are hydrochloric acid, sulfuric acid, orthophosphoric acid, and benzene sulfonic acid, as well as acid acting salts such as zinc chloride. These materials, of both basic and acid type, are those which are commonly employed in condensation reactions and hence they are generically referred to herein as "condensation catalysts." The catalyst may be used in any suitable amount depending on the nature of the catalyst chosen, the character of the reactant and the operating conditions of the reaction. In general, however, an amount of catalyst ranging from 0.01 to 5%, and preferably from 0.05 to 1%, based on the weight of the imino reactant, represents a suitable amount when carrying on the process of this invention in the liquid phase and in a batch manner.

As stated above, the process will proceed at a relatively slow rate even at room temperature. On the other hand, much better results are obtained when the reaction is conducted at elevated temperatures, as those between 50 and 200° C. A preferred temperature range is from 75 to 150° C.

The reaction may usually be carried out at atmospheric pressure, though if desirable or necessary, as when using a low-boiling imine reactant, slightly elevated pressures, as to up to 10 atmospheres, may be employed to keep the imine in the liquid phase. In some cases it is desirable to conduct the reaction under subatmospheric pressure conditions. One such instance is that wherein the primary amine reaction product formed in carrying out the process of this invention has a boiling point above that at which it is desired to conduct the reaction. In the preferred practice of this invention the said amine reaction product is distilled off or otherwise removed from the reaction mixture substantially as fast as formed, and the establishing of a subatmospheric pressure in the reaction chamber favors the removal of the amine as a gas at a lower temperature than would otherwise be possible.

The time required for the completion of the reaction will vary from one-half to four or more hours under favorable reaction conditions. However, should the reaction be conducted at lower temperatures than those here recommended or in the absence of a catalyst, the reaction period must be considerably extended in order to obtain the best possible yield.

The process of this invention may be carried out in the presence or absence of a solvent, a material of this type preferably being used only when it is desirable to increase the fluidity of the reaction mixture. When a solvent is used, it should be an organic medium which is both liquid as well as inert under the reaction conditions employed. Suitable solvents for this purpose are xylol, isooctane, dioxane, ethyleneglycol, diethyl ether, diethyleneglycol diethyl ether, and the like.

The imine reactant may be condensed in either a batchwise, continuous or intermittent manner, though the batchwise treatment is preferred. Here the imine starting compound is simply introduced into a suitable vessel either with or without a catalyst, where it is heated for the desired length of time. Simultaneously the primary amine formed as a product of the resulting reaction is removed substantially as formed, preferably by distillation. In the case of continuous operation the imine reactant may be fed at a constant rate into a heated catalyst-containing reaction zone from which the reaction mixture is continuously withdrawn for separation of the desired imine product. Various other procedural modifications will suggest themselves to those skilled in the art.

At the conclusion of the reaction interval the unsaturated imine condensation product may be recovered in any desired manner. Normally the product is a stable one which may be separated from the reaction mixture by conventional distillation methods, sometimes at reduced pressure. Other methods of separation may be employed.

The following examples will illustrate the manner in which the present invention finds embodiment.

Example I

One hundred parts of N-propylidene-1,3-dimethylbutylamine were placed in a retort together with 0.5 parts of a trimethylbenzylammonium hydroxide catalyst. The mixture was then refluxed for a period of three hours, the 1,3-dimethylbutylamine formed during the refluxing period being distilled off as formed. The resulting reaction mixture was found to contain 61 parts of N - (2-methyl-2-pentenylidene)-1,3-dimethylbutylamine. The latter product distilled at 138 to 140° C. at 100 mm. mercury.

Example II

In this operation 258 parts of N-propylidene-1,3-dimethylbutylamine were placed in a retort and there maintained at a temperature of 80° C. for a period of 16 hours in the absence of any catalyst, the 1,3-dimethylbutylamine formed being allowed to escape as rapidly as produced. The resulting reaction mixture contained 99 parts of the desired beta, gamma unsaturated imine product, i. e., N-(2-methyl-2-pentenylidene)-1,3-dimethylbutylamine.

Example III

A mixture was formed comprising 100 parts of N - propylidene - 1,3-dimethylbutylamine and 0.5 parts of trimethylbenzylammonium hydroxide catalyst. This was then placed in a flask and there refluxed for a period of four hours with simultaneous elimination of the 1,3-dimethylbutylamine formed. It was found that the product obtained as a result of this refluxing treatment contained 38 parts of N-(2-methyl-2-pentenylidene)-1,3-dimethylbutylamine, the composition of which was verified by hydrolizing the product and recovering alpha-methyl-beta-ethylacrolein (B. P. 137–138° C.) from the hydrolized mixture.

Example IV

In this operation 320 parts of N-isopropylidene-isopropylamine were heated with two parts of concentrated hydrochloric acid for two hours at 80 to 140° C., isopropylamine being distilled off as formed. The residue contained 36 parts of N-(1,3-dimethyl-2-butenylidene)-isopropylamine, as determined by hydrolizing the same and measuring the amount of mesityl oxide so formed.

Example V

It was desired to prepare mesityloxide anil. To that end acetonanil was allowed to stand for a period of several days. At the expiration of that interval the mixture was distilled and mesityloxide anil was recovered as the fraction boiling at 128 to 130° C. at 20 mm. mercury. The latter product was readily converted into mesityloxide on hydrolysis with dilute sulfuric acid.

Example VI

In a manner similar to that described in Example I above, N-isopropylidenebenzylamine may be refluxed with a small quantity of a trimethylbenzylammonium hydroxide catalyst, the benzylamine produced being distilled off as formed. From the resulting reaction mixture there may be recovered N-(4-methyl-3-penten-2-ylidene)-benzylamine.

Example VII

By refluxing a mixture containing N-ethylidene-p-toluidine together with a small amount of concentrated HCl as catalyst, and distilling off the resulting toluidine as formed, there may be obtained in good yield N-(2-butenylidene)-p-toluidine.

I claim as my invention:

1. The method of forming N-(2-methyl-2-pentenylidene)-1,3-dimethylbutylamine comprising refluxing N-propylidene-1,3-dimethylbutylamine while removing the 1,3-dimethylbutylamine produced substantially as soon as formed, the N-(2-methyl-2-pentenylidene)-1,3-dimethylbutylamine formed being recovered from the resulting reaction mixture.

2. The method of claim 1 wherein said refluxing step is carried out in the presence of a base as a catalyst.

3. The method of forming N-(1,3-dimethyl-2-butenylidene)-isopropylamine comprising refluxing N-isopropylideneisopropylamine while removing the isopropylamine produced substantially as soon as formed, the N-(1,3-dimethyl-2-butenylidene)-isopropylamine formed being recovered from the resulting reaction mixture.

4. The method of claim 3 wherein said refluxing step is carried out in the presence of an acid as a catalyst.

5. A process for the production of an imine of the general formula

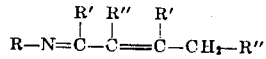

wherein R is a hydrocarbon radical containing not more than one olefinic double bond and R' and R" are members of the group consisting of the hydrogen atom and the saturated hydrocarbon radicals, which comprises heating an imine of the formula

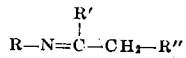

at a temperature at which an amine of the formula R—NH$_2$ distills from the reaction mixture under the existing pressure.

6. The process of claim 5 wherein the reaction is conducted at a temperature between 50° C. and 200° C.

7. The process of claim 5 wherein said reaction is carried out in the presence of a base as a catalyst.

8. The process of claim 5 wherein said reaction is carried out in the presence of an acid as a catalyst.

9. A process for the production of an imine of higher molecular weight from an aliphatic imine of lower molecular weight having the imino nitrogen atom linked to saturated hydrocarbon radicals and wherein the hydrocarbon radical linked by a double bond to the imino nitrogen atom contains at least two hydrogen atoms on the carbon atom in beta position with respect to said nitrogen atom, which comprises heating said lower molecular weight aliphatic saturated imine at a temperature at which the primary amine formed in the reaction distills from the reaction mixture under the existing conditions.

10. The process of claim 9 wherein the reaction is conducted at a temperature between 50° C. and 200° C.

11. The process of claim 9 wherein said reaction is carried out in the presence of a base as a catalyst.

12. The process of claim 9 wherein said reaction is carried out in the presence of an acidic compound as a catalyst.

VERNON E. HAURY.

No references cited.